(12) United States Patent
Segall

(10) Patent No.: US 8,475,168 B2
(45) Date of Patent: Jul. 2, 2013

(54) PERSONNEL CASUALTY SIMULATOR

(76) Inventor: Stuart C. Segall, La Jolla, CA (US)

( * ) Notice: Subject to any disclaimer, the term of this patent is extended or adjusted under 35 U.S.C. 154(b) by 1728 days.

(21) Appl. No.: 11/745,865

(22) Filed: May 8, 2007

(65) Prior Publication Data

US 2012/0202175 A1   Aug. 9, 2012

(51) Int. Cl.
*F41G 3/26* (2006.01)

(52) U.S. Cl.
USPC ............................................. 434/22; 434/11

(58) Field of Classification Search
USPC ................. 434/11–27; 472/65, 72, 82; 40/410
See application file for complete search history.

(56) References Cited

U.S. PATENT DOCUMENTS 6,814,024 B2 * 11/2004 Lazecki ....................... 116/200

* cited by examiner

*Primary Examiner* — Timothy A Musselman
(74) *Attorney, Agent, or Firm* — Gary L. Eastman, Esq.

(57) ABSTRACT

A system and method uses three-dimensional, visual feedback for simulated weapons fire during training of a soldier in a combat exercise. In the system, the soldier is provided with a weapon equipped with a laser transmitter that simulates the firing of actual rounds. Further, sensors are positioned on a human target. Also, discharge members are located on the human target. When a signal is received by a sensor, selected discharge members are activated to immediately expel a plume of dust. As a result, the plume of expelled dust provides three-dimensional, visual feedback to the soldier in real-time.

20 Claims, 1 Drawing Sheet

PERSONNEL CASUALTY SIMULATOR

FIELD OF THE INVENTION

The present invention pertains generally to training aids. More particularly, the present invention pertains to training aids that are used to simulate a combat exercise for soldiers firing small arms at a target of opportunity. The present invention is particularly, but not exclusively, useful as a system and method for providing three-dimensional, visual feedback for simulated rounds fired by a soldier.

BACKGROUND OF THE INVENTION

In the past, the U.S. military has trained soldiers in the use of small arms through the use of a multiple integrated laser engagement system (MILES). Typically, in such training, a laser transmitter is mounted to a weapon and aligned to send a laser light beam along the normal trajectory of a bullet fired from the weapon. Thereafter, when the weapon is aimed at a target and is fired, an infrared laser beam is emitted from the weapon. If the aim is accurate, this laser beam will be incident on a sensor located on the target. In certain systems, the sensor records the hit, and sometimes the source of the laser as well, for later evaluation. Further, if the target is a person, the sensor may provide an audio alarm instructing the target to lie down and "play dead." In such systems, however, the firing soldier does not see a realistic, real-time result from his/her shot.

Despite this limitation, the U.S. military training programs, along with the movie industry, have provided the most notable simulations of weapons fire. In the movies, however, situations simulating gun fire are scripted, orchestrated, rehearsed and presented under tightly controlled circumstances. Every event in the simulation is planned and practiced. Importantly, every weapon simulation presented in the movies is performed "for the camera." Although there is an emphasis on a realistic presentation for the camera, it is not combat and, indeed, is not really presented to achieve a physical perception of actual combat. On the other hand, although military weapon fire training exercises are conducted with efforts to include as much realism as possible, they do not provide realistic feedback to the shooter in real-time.

In light of the above, it is an object of the present invention to provide a system and method for providing real-time feedback to a solider firing a weapon at a human target, for both hits and misses. Another object of the present invention is to provide a system and method for creating a three-dimensional visual indication of a hit or a miss from simulated weapon fire. Yet another object of the present invention is to simulate entrance and exit wounds from a single simulated weapon shot. Still another object of the present invention is to provide a system and method for simulating a realistic result from weapon fire that is easy to use and install, that is simple to operate and that is cost effective.

SUMMARY OF THE INVENTION

In accordance with the present invention, a system uses immediate, three-dimensional, visual feedback for weapon fire during training of a soldier in a simulated combat exercise. In training, the soldier fires a weapon equipped with a laser transmitter. When fired, the laser transmitter emits infrared "bullet" signals simulating the firing of actual rounds by the soldier. Further, the system includes a plurality of sensors that are able to receive the infrared signals from the laser transmitter. Specifically, these sensors are selectively positioned on human targets. More specifically, the sensors are worn on the targets' vests and helmets.

In addition to the sensors, the system includes a plurality of discharge members for expelling plumes of dust to imitate the effect of a "hit", as though actual rounds had been fired. For a human target, the discharge members are positioned at selected positions on the target's vest and helmet. Structurally, each discharge member includes a chamber that is packed with dust. Further, the discharge member is connected in fluid communication with a tank of pressurized gas. For example, a tank of pressurized gas like nitrogen may be worn on a target's vest and connected to the discharge members on the vest and helmet. For purposes of the present invention, the tank is in fluid communication with the inlet of a manifold. Further, the manifold includes a plurality of outlets, with each outlet in fluid communication with a respective discharge member. Also, a solenoid valve is positioned on each outlet of the manifold to control the flow of the pressurized gas from the tank to the discharge members.

In order to operate the solenoid valves, the system includes a trigger device that is electrically connected to the sensors. Also, the system is provided with a firing box electrically interconnected between the trigger device and the solenoid valves. With this construction, the firing box can open a selected solenoid valve in response to a signal that is received by a respective sensor and then communicated to the trigger device. As a result of the opened solenoid valves, dust is expelled from the respective discharge members. Preferably, the trigger device and firing box are positioned on the target's vest.

In addition to human targets, the system contemplates providing three-dimensional, visual feedback from background surfaces in the combat environment. Specifically, the system includes panels that have embedded sensors and discharge members, as well as the above-identified operative components interconnecting the sensors and discharge members. These panels are positioned on horizontal and vertical backgrounds to give the soldier an indication from errant shots. Also, sensors can be provided on vehicle targets. For vehicles, however, the sensors are preferably connected to pyrotechnic devices rather than discharge members. In this manner, the system can simulate an explosion when a sensor on the vehicle receives a signal from the laser transmitter.

During a simulated combat exercise, human targets move through the combat environment without any predetermined or repeated routes. Further, targets may flee when shots are fired. As a result, the soldier views a realistic progression of events in the combat environment. When the soldier fires a shot, the laser signal strikes a sensor on the human target, or on a background panel. When the signal is received by the sensor, it is communicated to the trigger device. Immediately, the trigger device activates the firing box to open the appropriate solenoid valve for a short period of time. When the solenoid valve opens, a burst of gas is emitted from the tank through the respective discharge member. As a result, a plume of dust is expelled from the discharge member indicating a hit (when the discharge member is on the target) or a miss (when the discharge member is positioned on a background surface). Accordingly, in the latter instance (i.e. a miss), the soldier may adjust his aim.

In a preferred embodiment, the visual feedback provided by the system imitates the visual feedback that manifests when an actual round strikes a human target. Specifically, when a laser signal strikes a sensor, a discharge member expels a plume of dust from the simulated entrance wound and a second discharge member expels a larger plume of dust from the simulated exit wound. In order to provide for this heightened level of realism, the human target may be provided with sensors and discharge members at his right and left shoulders, right and left hips, chest, various positions on his back, and multiple positions on his helmet. For purposes of understanding the system, consider a first sensor positioned at the target's chest, a first discharge member positioned at his chest, and a second discharge member positioned at his back. In response to the receipt of a laser signal at the first sensor, the firing box activates the first discharge member to expel a plume of dust having a volume $V_1$. At the same time, the firing box activates the second discharge member to expel a plume of dust having a volume $V_2$, with $V_1<V_2$.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
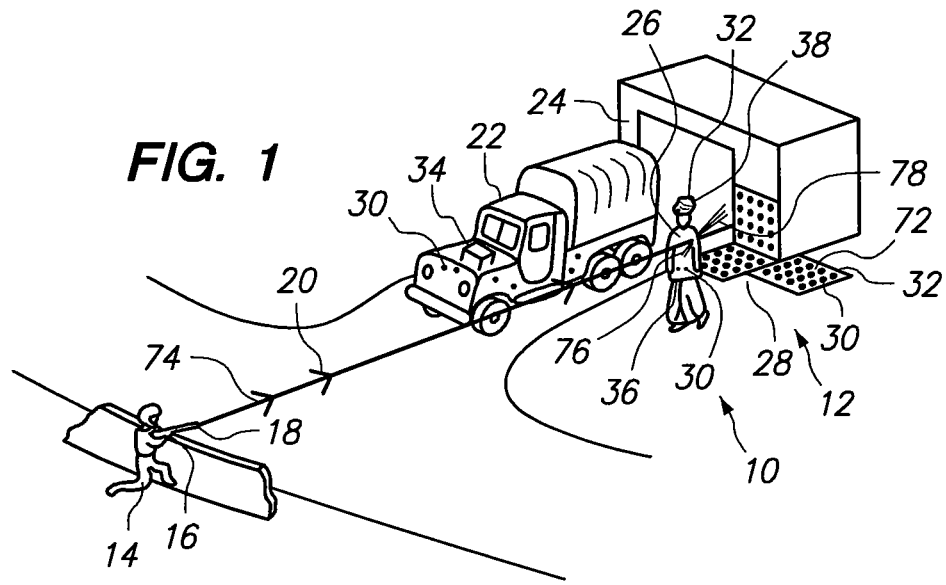
FIG. 1 is a perspective view of an employment of the system of the present invention for simulating three-dimensional visual feedback for a direct hit on a human target.

Referring initially to FIG. 1, a system in accordance with the present invention is shown and is generally designated 10. As shown, the system 10 is used in a simulated combat environment 12. Specifically, a sniper or soldier 14 has a small arms weapon 16 that is equipped with a laser transmitter 18 for shooting an infrared laser signal 20, as is known in the art. Further, the simulated combat environment 12 includes a vehicle 22 and a structure 24. As shown, an opposing force member serves as a human target 26 for the soldier 14. In FIG. 1, it can be seen that the vehicle 22, structure 24, human target 26, and the background 28 around the human target 26 include sensors 30 for receiving the infrared laser signal 20. For the structure 24, human target 26, and background 28, the discharge members 32 are provided near, and interconnected to, the sensors 30. With this interconnection, a discharge member 32 creates three-dimensional visual feedback for the soldier 14 upon receipt of the laser signal 20 by the sensor 30. For the vehicle 22, the sensors 30 are interconnected with a pyrotechnic device 34 such as a squib explosive or special effects using fire and/or smoke.

Figure 2:
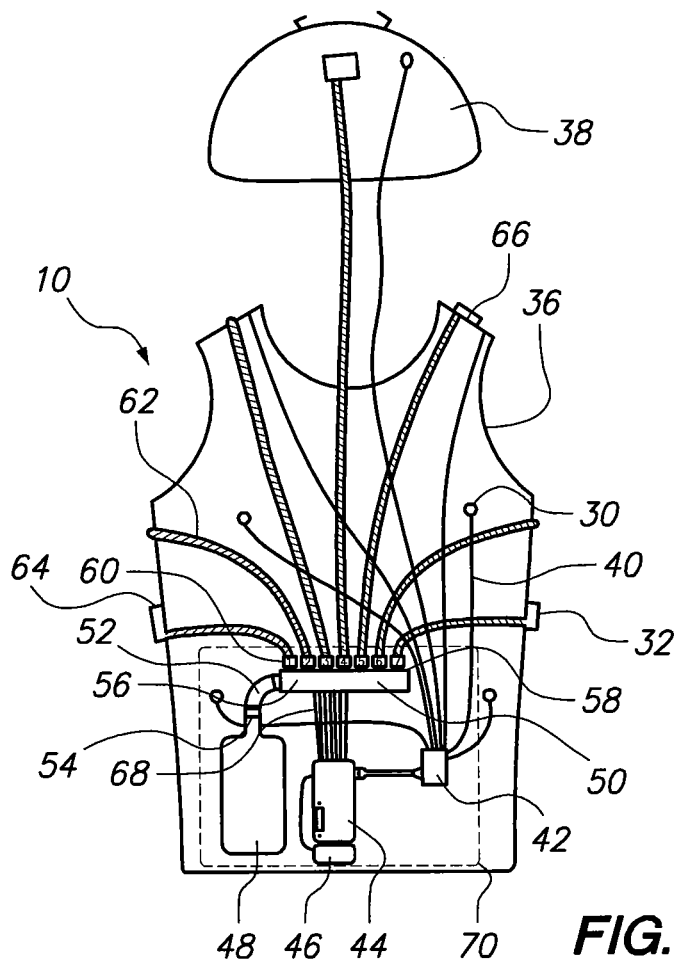
FIG. 2 is a front elevation view of the components of the system in FIG. 1 shown mounted on a vest and helmet.

For the human target 26, the sensors 30 and discharge members 32 are mounted on a vest 36 and helmet 38 worn by the human target 26. As shown in FIG. 2, the sensors 30 are connected via leads 40 to a trigger device 42 to communicate that a signal 20 has been received at a specific sensor 30. Alternatively, the sensors 30 may have a wireless connection to the trigger device 42. As further shown, the trigger device 42 is electrically connected to the firing box 44 that is interconnected with a battery pack 46 for power.

Referring now to the pneumatic components of the system 10, a tank 48 contains a pressurized inert gas such as nitrogen. Further, the tank 48 is connected in fluid communication with a manifold 50 via a tube 52. Specifically, the tube 52 connects the opening 54 of the tank 48 with the inlet 56 of the manifold 50. As shown, the manifold 50 includes seven outlets 58. Further, controlling the fluid flow out of each outlet 58 are solenoid valves 60. Beyond the solenoid valves 60, each outlet 58 of the manifold 50 is in fluid communication with a respective discharge member 32 via a tube 62. Inside each discharge member 32 is a compartment 64 packed with dust 66 which is partially expelled each time fluid flows out of the discharge member 32. It is noted that several sensors 30 and discharge members 32 are not shown in FIG. 2 because they are positioned on the front of the vest 36.

Referring back to the firing box 44, the connection between the electrical and the pneumatic components of the system 10 is explained. As shown, the firing box 44 is connected to the manifold 50 via leads 68. More specifically, each lead 68 connects to a specific solenoid valve 60. Therefore, the firing box 44 may open any specific solenoid valve 60 by passing a current through the respective lead 68. As a result, dust 66 can be expelled from a specific discharged member 32 based on the current passed by the firing box 44. In FIG. 2, it can be seen that the system components other than the sensors 30, discharge members 32, leads 40 and tubes 62 are contained within a lightweight waterproof housing 70.

As shown in FIG. 1, sensors 30 and discharge members 32 are also provided on the structure 24 and background 28. Specifically, the sensors 30 and discharge members 32 are embedded in panels 72 that are positioned in the combat environment 12. While not illustrated, it is understood that the panels 72 are equipped with the same electrical and pneumatic components as the vest 36 to allow for operation of the system 10. Preferably, the panels 72 have an exposed area of about four feet by four feet and are lightweight to allow easy set up and transportation.

Still referring to FIG. 1, the operation of the system 10 may be understood. Initially, the soldier 14 fires his weapon to emit an infrared signal 20 along the direction of arrow 74. In FIG. 1, the signal 20 is received by a sensor 30 mounted on the vest 36 of the human target 26. As a result, the sensor 30 communicates the signal 20 to the trigger device 42, and the trigger device 42 activates the firing box 44. When activated, the firing box 44 sends a current to energize the solenoid valve 60 that corresponds to the discharge member 32 nearest the sensor 30. As a result, the pressurized gas escapes out of the discharge member 32 nearest the sensor 30, carrying dust 66 with it to create a plume of dust 76 to simulate an entrance wound.

At the same time the entrance wound is simulated, an exit wound is also simulated. Specifically, the firing box 44 also sends a current to the solenoid valve 60 corresponding to the discharge member 32 opposite the "entrance wound" discharge member 32. Further, the current to create the exit wound simulation is applied for a longer period of time than the current that creates the entrance wound. As a result, a larger plume of dust 78 is expelled from the "exit wound" discharge member 32. As shown in FIG. 1, the volume $V_1$ of the entrance wound simulating plume 76 is less than the volume $V_2$ of the exit wound simulating plume 78. ($V_1<V_2$). In this manner, the soldier 14 is provided with a highly realistic, dynamic, three-dimensional visual indication of the successful shot at the human target 26. It is noted that the panels 72 provide an equally realistic dynamic, three-dimensional visual indication of a missed shot which is received by a sensor 30 on a panel 72.

While the particular Personnel Casualty Simulator as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A system for training a soldier during a simulated combat exercise comprising:
   a weapon equipped with a laser transmitter to emit signals simulating the firing of actual rounds by the soldier at a human target in a combat environment;
   a plurality of sensors for receiving the signals from the laser transmitter, wherein the sensors are worn by the human target;
   a plurality of discharge members worn by the human target for expelling a plume of dust; and
   a means for activating a selected discharge member to immediately expel a plume of dust when a sensor receives a signal from the laser transmitter, with the plume of expelled dust providing three-dimensional, visual feedback to the soldier.

2. A system as recited in claim 1 wherein the activating means comprises:
   a tank of pressurized gas worn by the human target;
   a manifold having an inlet in fluid communication with the tank and a plurality of outlets, with each outlet being connected to a respective discharge member;
   a plurality of solenoid valves, with each solenoid valve being positioned at a respective manifold outlet to control a flow of pressurized gas from the tank to the respective discharge member; and
   a firing box electrically interconnected between the sensors and the solenoid valves, with the firing box opening a selected solenoid valve to expel dust from the respective discharge member in response to a respective sensor receiving a signal from the laser transmitter.

3. A system as recited in claim 2 further comprising a trigger device electrically interconnected between the sensors and the firing box, with the trigger device directing the firing box to open the selected solenoid valve in response to the respective sensor receiving a signal from the laser transmitter.

4. A system as recited in claim 2 wherein a first sensor is positioned at the human target's chest, a first discharge member is positioned at the human target's chest, and a second discharge member is positioned at the human target's back, and wherein, in response to the receipt of a laser signal at the first sensor, the firing box activates the first discharge member to expel a plume of dust having a volume $V_1$, and the firing box activates the second discharge member to expel a plume of dust having a volume $V_2$, with $V_1 < V_2$.

5. A system as recited in claim 1 wherein the sensors, discharge members, and the activating means are positioned in a vest worn by the human target.

6. A system as recited in claim 5 further comprising sensors and discharge members positioned on a helmet worn by the human target.

7. A system as recited in claim 1 further comprising:
   a plurality of panels positioned in the combat environment, with each panel having a plurality of sensors for receiving the signals from the laser transmitter;
   a plurality of discharge members positioned on the panels for expelling a plume of dust; and
   a means for activating a selected discharge member positioned on a panel to immediately expel a plume of dust when a sensor receives a signal from the laser transmitter, with the plume of expelled dust providing three-dimensional, visual feedback to the soldier.

8. A system as recited in claim 7 further comprising:
   at least one vehicle positioned in the combat environment, with each vehicle having a plurality of sensors for receiving the signal from the laser transmitter;
   a pyrotechnic device positioned on each vehicle; and
   a means for activating the pyrotechnic device on a vehicle to immediately mimic an explosion when a sensor on the vehicle receives a signal from the laser transmitter.

9. A system for training a soldier during a simulated combat exercise comprising;
   a means for transmitting a signal from the soldier to a human target in a combat environment, with the signal simulating the firing of an actual round by the soldier at the human target, and with the signal travelling in a first direction;
   a means for receiving the signal at the body of the human target;
   a first means for immediately expelling a plume of dust in a second direction, substantially opposite to the first direction, from the body of the human target in response to receipt of the signal to provide three-dimensional, visual feedback to the soldier; and
   a second means for immediately expelling a plume of dust in the first direction from the body of the human target in response to receipt of the signal to provide three-dimensional, visual feedback to the soldier.

10. A system as recited in claim 9 wherein the receiving means is positioned at the human target's chest, the first means is positioned at the human target's chest, and the second means is positioned at the human targets back, and wherein the first means expels a plume of dust having a volume $V_1$, and the second means expels a plume of dust having a volume $V_2$, with $V_1 < V_2$.

11. A system as recited in claim 9 where the first and second means comprise:
   a tank of pressurized gas worn by the human target;
   a manifold having an inlet in fluid communication with the tank and a plurality of outlets, with each outlet being connected to a respective discharge member;
   a plurality of solenoid valves, with each solenoid valve being positioned at a respective manifold outlet to control a flow of pressurized gas from the tank to the respective discharge member; and
   a firing box electrically connected to the solenoid valves, with the firing box opening two selected solenoid valves to expel dust from the respective discharge members in response to the receipt of a signal.

12. A system as recited in claim 11 wherein the transmitting means is a weapon equipped with a laser transmitter, and wherein the receiving means comprises a plurality of sensors positioned on the human target.

13. A system as recited in claim 12 further comprising a trigger device electrically interconnected between the sensors and the firing box, with the trigger device directing the firing box to open the selected solenoid valve in response to the respective sensor receiving a signal from the laser transmitter.

14. A system as recited in claim 9 wherein the receiving means, the first means and second means are positioned in a vest worn by the human target.

15. A system as recited in claim 9 wherein the receiving means, the first means and second means are positioned on a helmet worn by the human target.

16. A system as recited in claim 15 further comprising a plurality of panels positioned in the combat environment, with each panel having a means for receiving the signal and a third means for expelling a plume of dust from the respective panel in response to receipt of the signal to provide three-dimensional, visual feedback to the soldier.

17. A method for training a soldier during a simulated combat exercise comprising the steps of:
- equipping a weapon with a laser transmitter;
- transmitting a signal from the weapon to a human target in a combat environment to simulate the firing of an actual round by the soldier at the human target; equipping the human target with at least one discharge member;
- positioning a sensor on the body of the human target;
- receiving the signal from the laser transmitter with the sensor; and
- in response to the signal received by the sensor, activating a selected discharge member to immediately expel a plume of dust, with the plume of expelled dust providing three-dimensional, visual feedback to the soldier.

18. A method as recited in claim 17 further comprising the step of outfitting the human target with a tank of pressurized gas, a manifold having an inlet in fluid communication with the tank and a plurality of outlets, with each outlet being connected to a respective discharge member, a plurality of solenoid valves connected to a firing box, with each solenoid valve being positioned at a respective manifold outlet to control a flow of pressurized gas from the tank to the respective discharge member, and with the firing box opening a selected solenoid valve to expel dust from the respective discharge member in response to a respective sensor receiving a signal from the laser transmitter.

19. A method as recited in claim 18 wherein the sensor is positioned at the human target's chest, a first discharge member is positioned at the human target's chest, and a second discharge member is positioned at the human target's back, and wherein, when the sensor receives the signal, the first discharge member expels a plume of dust having a volume $V_1$, and the second discharge member expels a plume of dust having a volume $V_2$, with $V_1<V_2$.

20. A method as recited in claim 17 further comprising the steps of:
- transmitting the signal from the soldier to a background panel in the combat environment when the signal misses the human targets;
- receiving the signal with a sensor on the background panel; and
- immediately expelling a plume of dust from a discharge member on the background panel in response to the signal to provide three-dimensional, visual feedback to the soldier.

* * * * *